UNITED STATES PATENT OFFICE.

EDWARD DOUGLASS, OF GORHAM, MAINE.

IMPROVED COMPOSITION TO DESTROY THE APPETITE FOR TOBACCO.

Specification forming part of Letters Patent No. 91,218, dated June 15, 1869.

Be it known that I, EDWARD DOUGLASS, of Gorham, in the county of Cumberland and State of Maine, have invented a composition which I call "Orton's Preparation," the use of which for thirty days will entirely destroy the desire or appetite for tobacco, either chewing or smoking.

The composition is in the form of a gum, which is taken into the mouth by the patient and chewed whenever he has a desire or hankering for tobacco.

In destroying the appetite for tobacco by use of the gum an appetite for the latter is not acquired.

The gum is composed of the following ingredients and in the following proportions: Rosin, three-fourths part; beeswax, two twenty-fourths part; white wax, one twenty-fourth part; poplar-bark, four ninety-sixths part; Cayenne pepper, one ninety-sixth part; plantain, four ninety-sixths part; Virginia snake-root, three ninety-sixths part.

What I claim as my invention, and desire to secure by Letters Patent, is—

A medical compound composed of the ingredients herein mentioned, combined substantially in the manner and proportions herein set forth.

Gorham, May 15, 1869.

EDWARD DOUGLASS.

Witnesses:
   A. B. RAND,
   G. H. DOUGLASS.